March 8, 1966  E. L. ALEXANDER  3,239,016
DRILL PIPE SECTIONS AND METHOD OF AND APPARATUS FOR
AUTOMATICALLY BREAKING OUT THE CONNECTIONS THEREOF
Filed May 27, 1963  5 Sheets-Sheet 1

INVENTOR.
Emmett L. Alexander
BY
Paul E. Mullendore
ATTORNEY INVENTOR.
Emmett L. Alexander
BY Paul E. Mullendore
ATTORNEY March 8, 1966  E. L. ALEXANDER  3,239,016
DRILL PIPE SECTIONS AND METHOD OF AND APPARATUS FOR
AUTOMATICALLY BREAKING OUT THE CONNECTIONS THEREOF
Filed May 27, 1963  5 Sheets-Sheet 5

INVENTOR.
Emmett L. Alexander
BY
Paul E. Mullendore
ATTORNEY

United States Patent Office 3,239,016
Patented Mar. 8, 1966

3,239,016
DRILL PIPE SECTIONS AND METHOD OF AND APPARATUS FOR AUTOMATICALLY BREAKING OUT THE CONNECTIONS THEREOF
Emmett L. Alexander, Enid, Okla., assignor to George E. Failing Company, Enid, Okla., a corporation of Delaware
Filed May 27, 1963, Ser. No. 283,429
13 Claims. (Cl. 173—164)

This invention relates to drill pipe sections and a method of and apparatus for automatically coupling the drill pipe sections when adding to or making up a string of drill pipe in the rotary drilling of a bore hole, and for automatically uncoupling the sections when pulling the drilling string upon completion of the drilling operation, changing of the bit, and the like.

Conventional drill pipe as previously used consists of an externally threaded pin on the bottom end of one section of drill pipe that screws into an internally threaded box on the top end of the next section. The pin and box are usually provided in the form of couplings, called tool joints, and each coupling is provided with a tong-engaging portion so that tongs may be applied thereto in tightening up and breaking loose the joints.

In making a drilling string with conventional drill pipe, the drill bit is connected onto a section of drill pipe and lowered into the bore hole, to be held by slips. A following section of the drill pipe is moved into position so that the pin on the bottom end thereof drops into the box on the upper end of the section which is held by the slips. The tool point on one of the sections is then gripped by means of tongs to be held from rotation while the other section is rotated by a rotating mechanism to screw the threads of the pin into the threads of the box. Succeeding sections are added in like manner. A reverse procedure is employed in pulling the drilling string, but usually some sort of power means is connected with the tongs to break out the tightly setup joints. The stands or sections of drill pipe are handled with as much speed as possible, because drilling time is lost during running in and pulling of the drill pipe, consequently manipulation of the tongs and setting of the slips require hard manual work to make up and break out the connections, and the operations are extremely hazardous because they must be handled with dispatch and in exact coordination with the raising and lowering of the drilling string.

It is, therefore, a principal object of the present invention to provide drill pipe sections which require no tongs, slips, or manually applied power mechanisms to break out and make up the connections.

Other objects of the invention are to provide drill pipe sections and automatic operating means therefor particularly adapted for use with the traveling head type of drilling rigs; to provide an apparatus of this character which reduces the time of breaking out and making up of the joints; and to provide a structure of this character that eliminates the problem of the top end breaking out before the bottom end when using a traveling head type of drill.

In accomplishing these and other objects of the invention as hereinafter described, I have provided improved structure, the preferred form of which is illustrated in the accompanying drawings, wherein.

Referring more in detail to the drawings:

1 designates a section or length of drill pipe constructed in accordance with the present invention, and includes a tubular body 2 consisting of a joint of preferably heavy-walled pipe provided at the bottom and top ends thereof with pin and box coupling members 3 and 4, respectively.

Figure 2:
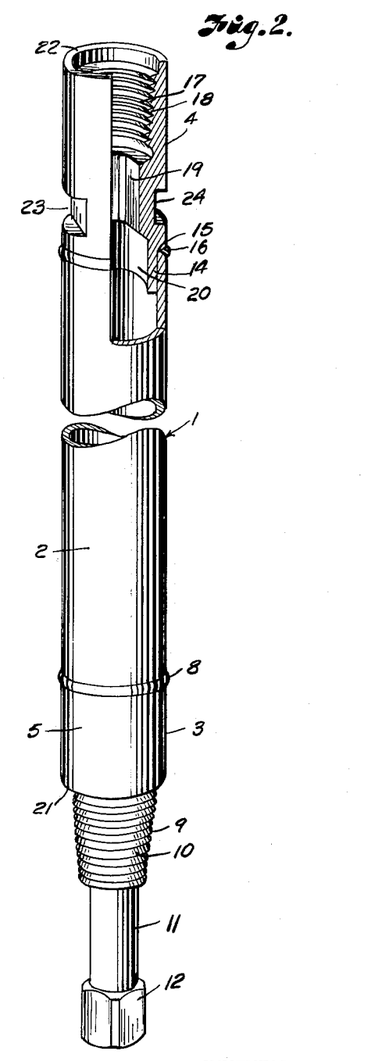
FIG. 2 is a perspective view of one of the sections of drill pipe that make up the drilling string, and showing a portion of the box on the upper end thereof in partial section to better illustrate the construction thereof.

The pin member 3 includes a preferably cylindrical portion 5 having an outer diameter substantially corresponding to the outer diameter of the pipe, and a reduced extension 6 having an outer diameter corresponding with the inner diameter of the pipe, to provide an annular shoulder 7. The reduced extension 6 is tightly fitted within the pipe, with the shoulder 7 abutting against the end of the pipe for connection therewith by an annular weld 8, so that the pin member 3 in effect constitutes an integral part. Extending from the opposite end of the member 3 is a tapering pin 9, having external threads 10. Extending from the pin is a reduced cylindrical neck or shank 11, provided on the terminal with a clutch part which may be a driving lug 12. The lug 12 may be generally of square cross section as shown, or the lug 12 may be provided with flutes or splines, to provide a driving connection for a purpose later described. The member 3 thus described is provided with an axial bore 13 that extends the length thereof.

The box member 4 may also be cylindrical in shape and has an outer diameter corresponding to the outer diameter of the pipe. The box member has a reduced extension 14, forming an annular shoulder 15 that abuts against the end of the pipe when the extension 14 is projected therein and secured by an annular weld 16. The box member 4 has its outer end provided with an internally tapering bore 17, having threads 18 corresponding with the threads 10 on the pin 9. Continuing from the tapered bore 17 is a clutch part which may be a driving socket 19 having a cross sectional shape and size corresponding to the driving lug 12 on the pin member 3.

Also formed in the box member 4 in axial alignment with the driving socket 19 is a cylindrical recess 20, having a diameter slightly greater than the diameter of the driving lug 12 across the corners thereof. The outer end face of one box member provides an annular seating face 21 and the annular shoulder that encircles the base of the tapered pin 9 provides a seating face 22, for a purpose later to be described, when the sections are connected together. The box members 4 have rectangular notches 23 and 24 in opposite faces thereof, also for a purpose to be later described.

In making up a string of drill pipe, a number of drill pipe sections as just described will be connected together, with the pin of one section tightly screwed into the threads of the box of a connecting section, with the seating faces 21 and 22 in contact to cooperate with the threads in providing leaktight joints. When the sections of drill pipe are connected, the driving lug on one passes through the driving socket of the next section of drill pipe, so that they are contained within the recesses 20. It is, therefore, essential that the necks 11 be long enough for the driving lugs to pass through the driving sockets prior to engagement of the threads on the pin with the internal threads in the box of the connecting section. This is required in order that one of the sections may be rotated relatively to the other, in order that the threads of the pins may be tightened in the threads of the boxes.

Figure 3:
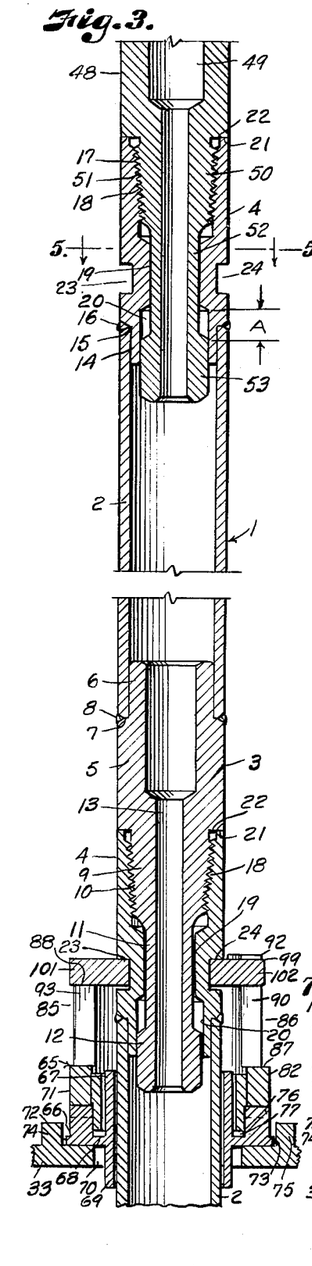
FIG. 3 is an enlarged vertical section through the upper portion of the drilling string illustrated in FIG. 1, with the box on the upper end engaging the threaded pin of the rotary spud and with the pin on the bottom end connected with the box on the upper end of the next lower section that is supported by the breakout fork and ready for uncoupling one or the other of the threaded connections, depending upon which is the first to break loose.

Consequently, when the joint is tightly made up between adjacent drill pipe sections, the driving lug on the pin will be spaced from the driving socket a distance as indicated by the dimension "A" in FIG. 3.

Also, it is necessary that the lengths of the driving sockets 19 are such that the lugs will keep in connection therewith until the threads of the pins 9 are free of the threads of the boxes upon unscrewing the sections of drill pipe, as when withdrawing the drilling string from a bore hole.

Figure 1:
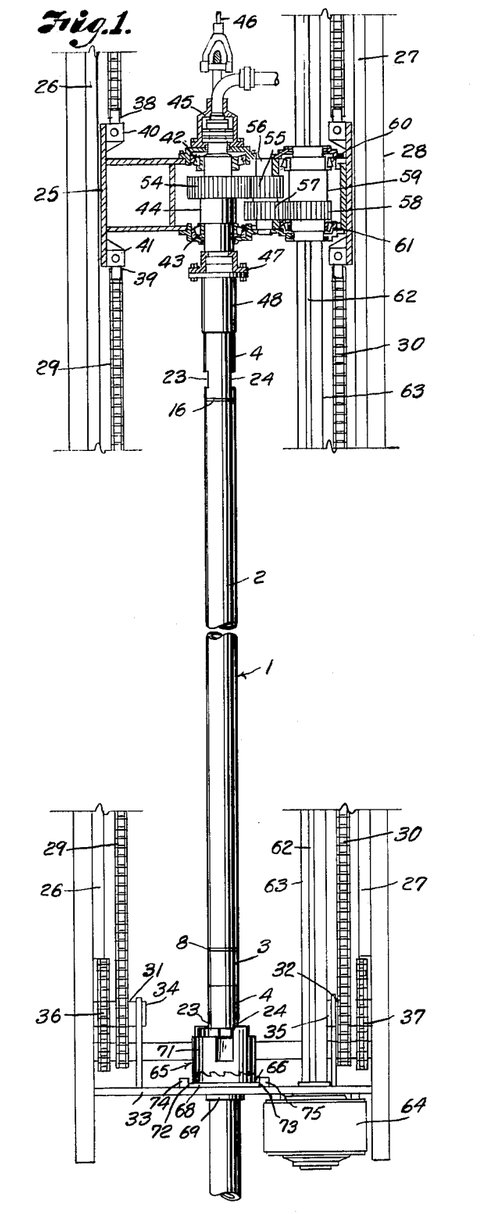
FIG. 1 illustrates a traveling head and base portions of a traveling head type of drilling rig, and associated therewith is the upper portion of a string of drill pipe embodying the features of the present invention and showing one drill pipe section pulled from the bore hole and tightly connected at its top end with a rotary spud carried by the traveling head and driven by a rotating mechanism, and showing the bottom end tightly connected with the next lower section supported by a breakout fork.

The sections of drill pipe thus described are preferably used in a traveling head type of drilling unit, as shown in part in FIG. 1, wherein a traveling head 25 is slidably guided for up and down travel along vertical guides 26 and 27 that are carried at inner opposite sides of a mast 28. The traveling head 25 is raised and lowered on the guides 26 and 27 by chains 29 and 30, operating over sprockets 31 and 32 located on opposite sides of the mast above the base or transverse platform 33 thereof, and over similar sprockets located at the top of the mast, not shown. The sprockets 31 and 32 are carried on stub shafts 34 and 35 that are driven by chain and sprocket connections 36 and 37 with a power mechanism, also not shown. The ends of the chains 29 and 30 are connected as indicated at 38 and 39 with lugs 40 and 41 that are connected with upper and lower sides of the traveling head 25.

Journaled vertically within the traveling head on antifriction bearings 42 and 43 is a tubular spindle 44 that is connected at its upper end with a swivel head 45 through which a drilling fluid under pressure, for example, compressed air, is admitted to the upper end of the drilling string. Also connected with the swivel head is a hoisting cable 46.

The lower end of the tubular spindle 44 extends below the traveling head 25 and carries a coupling 47 for a spud 48. The spud 48 has a through bore 49 in connection with the bore of the spindle for continuing flow of the drilling fluid into the drill pipe. The spud is keyed to the spindle by the coupling 47, so that it rotates with the spindle 44. The lower end of the spud 48 has a tapering pin 50 provided with external threads 51. The pin 50 has a neck 52 carrying a driving lug 53. The tapered pin 50, neck 52, and driving lug 53 are identical to the pin members 3, necks 11 and driving lugs 12 of the drill pipe sections previously described.

The tubular spindle 44 is rotated in the traveling head to effect rotation of the drill pipe and to automatically make up the connections therefor, as now to be described.

Fixed upon the spindle 44 is a gear 54, meshing with a gear 55 on a countershaft 56, also mounted in the traveling head parallel with the spindle 44. Also fixed on the countershaft 56 is a gear 57 meshing with a gear 58 on a drive sleeve 59. The drive sleeve 59 has its ends journaled in antifriction bearings 60 and 61, carried in the traveling head. The drive sleeve carries one or more splines (not shown) that engage in grooves 62 in a drive shaft 63 that extends substantially the full height of the mast alongside one of the chains, for example, the chain 30. The drive shaft 63 is mounted in the mast at the ends and is driven by a gearing, indicated by the casing 64, from a power means of the drilling rig, not shown.

In order to cooperate with the spud 48 to automatically disconnect and connect the drill pipe sections, the string of drill pipe extends through a ratchet collar 65 that is carried upon the platform 33. The ratchet collar includes a fixed element 66, best illustrated in FIG. 20, and which includes a sleeve portion 67, having an inner diameter to freely pass the drill pipe sections therethrough. The sleeve portion 67 is welded into an opening in the center of a horizontal plate 68 so as to have a lower end 69 depending from the plate to pass through an opening 70 in the platform.

Figure 20:
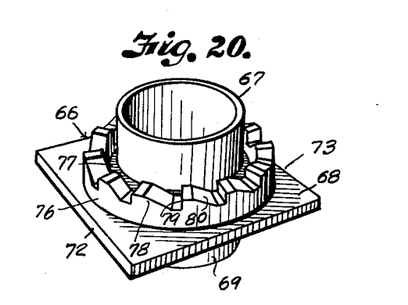
FIG. 20 is a perspective view of the fixed element of the collar.

Rotatable in the upper end of the sleeve 67 is a rotary element 71 of the ratchet collar 65, as later described. The plate 68 is of rectangular shape, so that opposite sides 72 and 73 thereof are engaged between ribs 74 and 75 that are upstanding on the platform at opposite sides of the opening 70 to fix the plate from rotation. Formed on the plate circumferentially of the sleeve portion 67 is an annular collar 76 that is spaced outwardly from the sleeve to provide an annular groove 77 therebetween. Formed on the upper edge of the collar is a circular series of spaced apart teeth 78. The forward faces 79 of the teeth in a clockwise direction about the ratchet collar are substantially vertical, while the faces 80 on the rear side of the teeth slope upwardly from the base of one tooth to the apex of the adjacent tooth, as shown in FIG. 20. Rotatably mounted on the upstanding portion of the sleeve is the rotary element 71 of the ratchet collar, which includes an annular collar portion 82, conforming to the inner and outer diameter of the fixed ratchet collar 76. Formed on the lower end of the collar 82 are a series of teeth 83, complementary to the teeth 78 in the fixed element, but reversely arranged thereto, so that the flat faces 84 of the teeth 83 are in the anticlockwise direction of rotation. The upper portion of the collar has diametrically opposed slots 85 and 86 terminating above the teeth 83 to form stops 87 at the terminals ends thereof.

Figure 19:
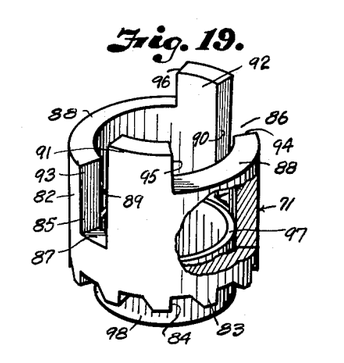
FIG. 19 is a perspective view of the rotatable elements of the clutch collar, a portion of which is broken away to better illustrate the construction thereof.

Projecting above the upper face 88 of the collar on the anticlockwise faces 89 and 90 of the slots are lugs 91 and 92, so that the faces 88 and 89 of the slots effectively continue to the top of the lugs. The opposite faces 93 and 94 of the slots, however, terminate at the arcuate faces 88, and the opposite faces 95 and 96 of the lugs extend upwardly from the faces 88.

The member 82 has a sleeve 97 inset within the tooth end of the collar and which is welded thereto to provide a depending portion 98, arranged to rotate within the groove 77 of the fixed element 66. The inner diameter of the sleeve 97 is of a size so that it is freely rotatable upon the sleeve 67 of the fixed element 66 of the ratchet collar. The relative height of the sleeves are such that when the teeth 83 of the upper ratchet element 71 ride over the teeth 78 of the fixed element 66, the sleeves 67 and 97 will retain their sleeved relation to maintain coaxial alignment of the ratchet elements.

Figure 18:
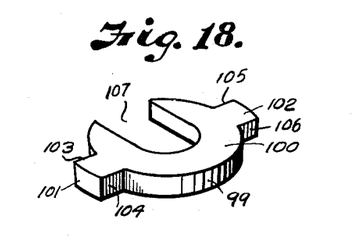
FIG. 18 is a perspective view of the breakout fork.

Removably mounted upon the faces 88 of the rotary element 71 is a fork 99, having a generally disk shaped portion 100 that is free to slide up and down within the rotary ratchet element 71. Extending diametrically from the disk portion are lugs 101 and 102 that are adapted to rest upon the faces 88 and which have stop faces 103–104 and 105–106 on opposite sides thereof for, respectively, engaging the faces 93, 89 and 90, 94 in certain positions of the fork, as later to be described. The lugs 101 and 102 are of a width so that they are freely slidable vertically within the slots 85 and 86, as later described.

The disk portion 100 of the fork has a notch 107 extending inwardly at one side thereof midway between the lugs 100 and 102 which has a width corresponding to the space between the bottoms of the notches 23 and 24 in the box ends 4 of the drill pipe sections. The fork has a thickness corresponding to the notches.

Assuming that a drilling string is to be made up to start drilling a bore hole, the spud 48 is secured to the spindle 44 by means of the coupling 47, and the hoisting cable 46 is connected with the swivel head 45, a clutch (not shown) for driving the chains 29 and 30 having been released.

The sections of drill pipe 1 are usually racked in the mast 28 or contained in a magazine (not shown) that is movably carried by or in the mast. One type of magazine which is especially adapted for use in racking the drill pipe sections of the present invention is shown in copending application Ser. No. 302,871, however, it is to be understood that the drill pipe sections 1 may be presented as required in any manner, since a specific mechanism is not a part of the present invention. If desired, a line manipulated by the hoisting mechanism of the drilling rig may be used, if no other means is available, to suspend the drill pipe sections over the bore hole so that they may be connected as now to be described.

A first section of drill pipe 1 with both members of the ratchet collar 65 thereon and with a drill bit attached to the lower end, is moved into position with the drill passing through the opening 70 in the platform 33 at the base of the mast and the plate 68 engaging in the space between the ribs 74 and 75.

The traveling head 25 is adjusted by means of the cable 46 along the guides 26 and 27 of the mast to bring the spud 48 so that the driving lug 53 thereon enters the box 4 at the upper end of the first drill pipe section and passes into the recess 20. The threads on the tapering pin 50 will be resting upon the threads of the box 4. With the drive shaft 63 in rotation, the spindle 44 is rotated through the drive sleeve 59 and gears that connect with the gear 54 on the spindle 44, to tighten the threads of the pin 50 on the spud into the threads 18 of the box 4. The drill pipe section offers sufficient resistance to rotation that the threads readily make up. As the threads make up, the driving lug 53 will move downwardly within the recess 20, a distance A.

The clutch (not shown) for driving the chains 29 and 30 will be engaged to force the drill bit into the earth simultaneously with rotation, to start drilling of the bore hole. When the drilling proceeds to the point where the spud 48 approaches the ratchet collar 65, it will be necessary to add another length of drill pipe. The fork 99 will be inserted in the grooves 23 and 24 in the box of the first drill pipe section, so that the lugs 101 and 102 of the fork seat upon the faces 88 of the ratchet collar. Upon reversing rotation, the lugs 101 and 102 will be moved over the slots 85 and 86 and into engagement with the faces 89 and 90 of the lugs 91 and 92. This will hold the first drill pipe section from rotation, because the ratchet collar element 66 is fixed relatively to the base 33 and the flat faces 79 and 84 of the teeth 78 and 83 are engaged in the direction that the drill pipe must be rotated to unscrew the joint. Consequently, the pin 50 on the spud will start to turn within the box 4 of the first drill pipe section. This is made possible because of the distance "A" of the lug 53 from the driving socket 19 when turning of the pin is started. By the time that "A" is taken up, the threads will have completely disengaged. The first drill pipe section will now be free of its connection with the spud 48 and the support thereof is on the fork 99, with lugs 101 and 102 resting on stops 87 at the bottoms of the slots 85 and 86.

The traveling head will be raised by the cable 46 to remove the lug 53 through the socket 19 and from the box 4. The drilling head 25 carrying the spud 48 will be lifted to a height so that a second section of drill pipe can be added to the first drill pipe section then supported in the bore hole.

The second drill pipe section will be brought into vertical position so that the lug 12 on the bottom end will enter the box 4 of the first drill pipe section, pass through the driving socket 19, and into the recess 20. In this position, the threads 10 on the pin 9 of the second section will rest upon the threads 18 in the box 4 of the first section. The traveling head 25 is now lowered by means of the cable 46, so that the lug 53 on the spud 48 enters the box 4 at the upper end of the second drill pipe section, passes through the driving socket 19, and into the recess 20. In this position, the threads 51 on the spud 48 bear upon the threads of the box 4 of the second section, and the threads of the pin 9 of the second section, as above stated, are resting upon the threads of the box 4 of the first section. But as the spud 48 rotates, the threads on the pin 50 will be the first to make up with the threads 18, followed by the threads on the pin 9 at the lower end of the second drill pipe section making up with the threads in the box of the first section, after which the fork 99 is removed from the collar 71. This is accomplished by lifting the drilling string until the lugs 101 and 102 are lifted out of the slots 85 and 86. The drilling string is then lowered to bring the drill bit into contact with the bottom of the hole. As the rotation proceeds, the bit starts rotation, which assures tight setup of the joints.

As the drilling progresses, additional sections of drill pipe will be added in similar manner until the bit has penetrated to the desired depth.

In case it becomes necessary to replace the bit or perform other drilling operations, or after completion of the bore hole to the proper depth, the drilling string is withdrawn from the bore hole. This is accomplished by lifting the drilling string and removing the drill pipe sections one at a time as they appear above the base of the mast. Since tightening of the threads is in the rotary direction of the drill bit, the threads have become firmly wedged together, but with drill pipe sections constructed as described, the sections are disconnected automatically under reverse rotation of the spindle 44, as now to be described.

Figures 4, 5, 6, 7:
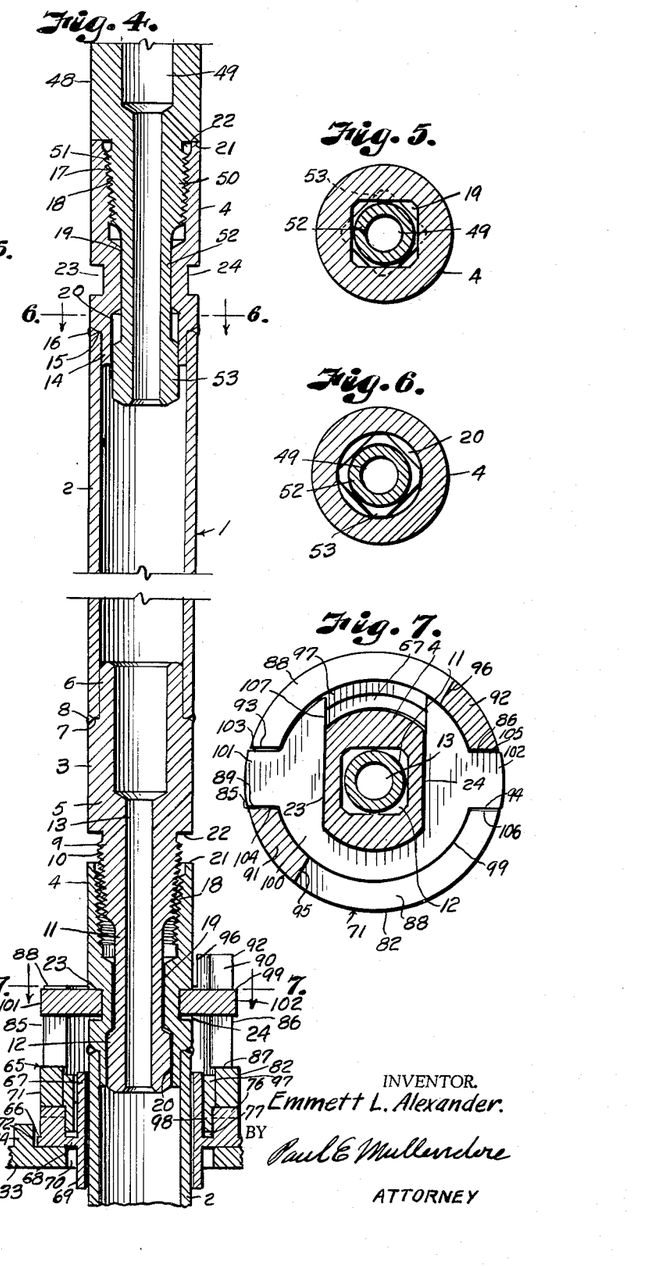
FIG. 4 is a similar section showing the pin at the lower end broken out and unscrewed just to the point of release of the threads and prior to dropping of the fork to effect engagement of the lug on the pin with the socket in the box of the fork-supported section, to effect unscrewing of the box on the top end from the pin of the stud.
FIG. 5 is a cross section on the line 5—5 of FIG. 3, showing the neck of the pin located to turn within the socket portion of the uppermost box and the lug located within the recess therebelow when the joint is tightly connected.
FIG. 6 is a cross section on the line 6—6 of FIG. 4, to better illustrate the position of the lug in the recess.
FIG. 7 is a cross section on the line 7—7 of FIG. 4, showing downward movement of the fork lugs in the slots of the collar during unscrewing of the lower joint.

On pulling the drilling string, the direction of rotation of the drive shaft 63 is reversed, so that the spindle and spud 44 and 48 unscrew the threads at the respective joints. With the drilling operations suspended, the drive clutch is disconnected from the chains 29 and 30 and up and down movement of the traveling head 25 is transferred to the cable 46. Thus by lifting the traveling head 25, the entire drilling string is raised in the bore hole until the grooves 23 and 24 in the box of the first joint appear above the faces 88 of the ratchet collar 65. The fork 99 is then applied, with the notch 107 thereof receiving the pipe, with opposite edges of the fork engaging in the grooves 23 and 24. The drilling string is then dropped back until the lugs 101 and 102 of the fork seat upon the faces 88 of the ratchet collar (FIG. 3). With the spindle under reverse rotation, the lugs 101 and 102 of the fork are carried across the upper ends of the slots 85 and 86, so that the side faces 104 and 105 of the lugs 101 and 102 engage the faces 89 and 90 of the lugs 91 and 92 (FIG. 7), to bring rotation of the drill pipe remaining in the bore hole to a halt, but the spud 48 continues to rotate to break out either the joint at the top or bottom ends of the drill pipe section to be removed, since it is not known which of the joints will break loose first.

Figure 8:
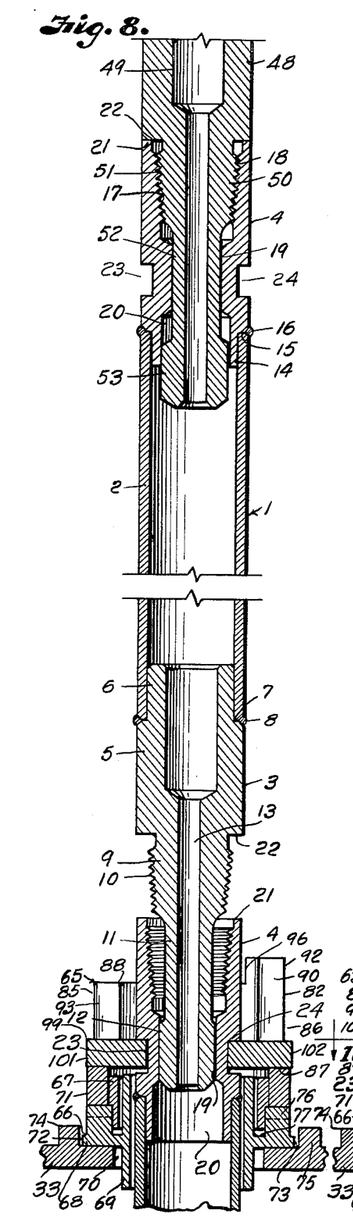
FIG. 8 is a section similar to FIG. 4, but showing the fork after it has dropped in the collar to effect engagement of the socket and to secure the section of drill pipe from rotation while the upper joint breaks loose.
Figures 9, 10, 11, 12:
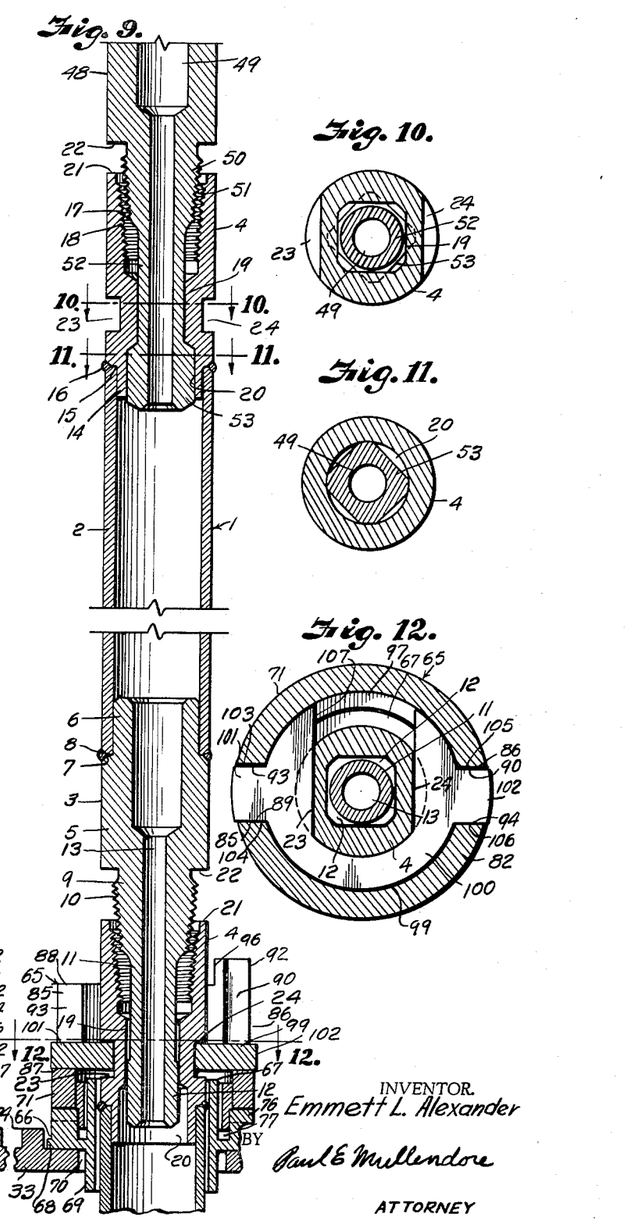
FIG. 9 is a similar view showing disconnection of the box at the upper end of the drill pipe section from the pin of the spud, thereby freeing the drill pipe section for removal.
FIG. 10 is a cross section on the line 10—10 of FIG. 9, showing that the neck of the spud is free to turn in the socket during unthreading of the joint.
FIG. 11 is a cross section on the line 11—11 of FIG. 9, showing that the lug is free for rotation in the recess during unthreading of the upper joint.
FIG. 12 is a cross section on the line 12—12 of FIG. 9, showing the fork at the bottom of the slots in the collar to support the drilling string remaining in the bore hole.

Assuming that the joint at the bottom end of the drill pipe section is the one to break loose (FIG. 4), the threads 10 on the pin 9 thereof unscrew from the threads 18 in the box 4 that is stopped from rotation by the fork. As the threads unscrew, the lugs 101 and 102 of the fork 99 move downwardly in the slots 85 and 86. This allows the string of drill pipe carried by the fork 99 to move downwardly in the bore hole, with the recess 20 in the bottom box 4 moving downwardly over the driving lug a distance corresponding to the dimension "A." At this time, the threads 10 of the pin 9 are completely loose from the threads 18 of the lower box 4, and the drilling string drops until the lugs 101 and 102 of the fork 99 engage the seats 87 at the bottoms of the slots. This movement of the drilling string brings the driving socket 19 of the lower box over the driving lug 12, as shown in FIG. 8, so that further rotation of the section of drill pipe comes to a stop, to cause the threads 51 of the pin 50 on the spud to break loose from the threads 18 of the box 4 at the upper end of the drill pipe section. During unscrewing of the pin 50 from the upper box, the drill pipe section lowers under gravity to bring the recess 20 of the upper box over the lug 53 on the spud 48, however, before the lug 53 enters the driving socket 19 of the upper box, the threads on the pin 50 have become disengaged from the threads on the upper box 4, as shown in FIG. 9, thus freeing both ends of the drill pipe section (see FIG. 14), and dropping the string of drill pipe until the lugs on the fork 99 engage the bottoms 87 of the slots 85 and 86. The traveling head is then raised to draw the lug 55 of the spud from the upper box, thereby freeing the upper end of the drill pipe section to be removed, which may be engaged by the racking mechanism, hoisting cable or the like, to lift the lug 12 on the lower end of the drill pipe section out of the box that is now supported by the fork 99.

After removing the disconnected drill pipe section, the traveling head 25 is lowered so that the lug 53 on the spud 48 passes into the box 4 on the upper end of the drilling string that remains in the bore hole. When the lug 53 enters the recess 20, the threaded pin on the spud turns in the screw threads of the box. The traveling head is thus again connected with the drilling string. When the traveling head is raised by means of the cable 46, to lift the drilling string until the box 4 on the next lower drill pipe section appears above the ratchet collar, the fork is again applied as before described to support the drilling string while the withdrawn drill pipe section is removed as previously described. This time, the pin on the spud may be the first to break loose, because it was not tightened by drilling (see FIG. 13).

Figure 13:
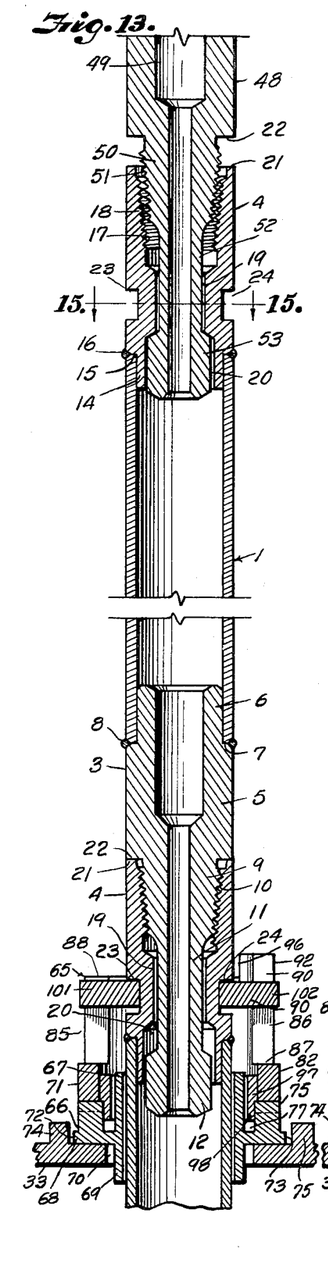
FIG. 13 is a section similar to FIG. 3, but showing position of the parts when the box on the upper end of the pulled-up drill pipe section is the first joint to break out.
Figures 14, 15, 16:
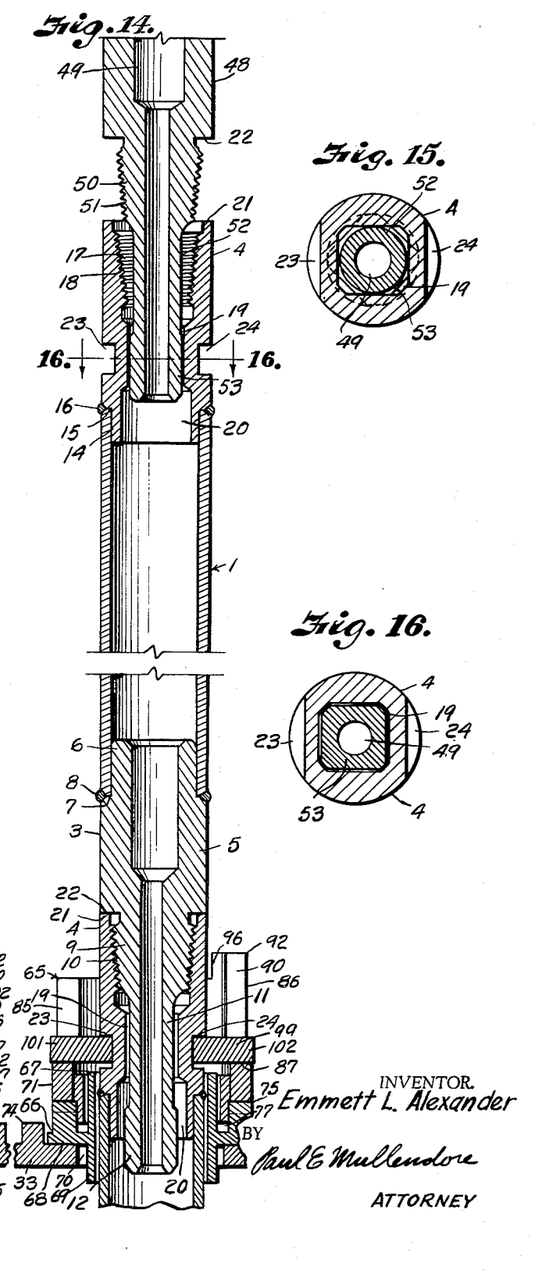
FIG. 14 is a similar section, and showing the box at the upper end completely unthreaded from the pin of the spud, and the fork dropped in the collar to bring the socket in the box at the upper end of the drill pipe section into engagement with the lug on the spud, whereby continued rotation of the spud disconnects the threads of the pin on the lower end of the drill pipe section from the box of the drill pipe section that is supported by the breakout fork.
FIG. 15 is a cross section on the line 15—15 of FIG. 13, showing that the neck on the spud is positioned in the socket and that the lug on the spud turns within the recess during unscrewing of the upper joint.
FIG. 16 is a cross section on the line 16—16 of FIG. 14, showing the driving connection between the lug on the spud with the socket, so that rotation of the spud rotates the drill pipe section.
Figure 17:
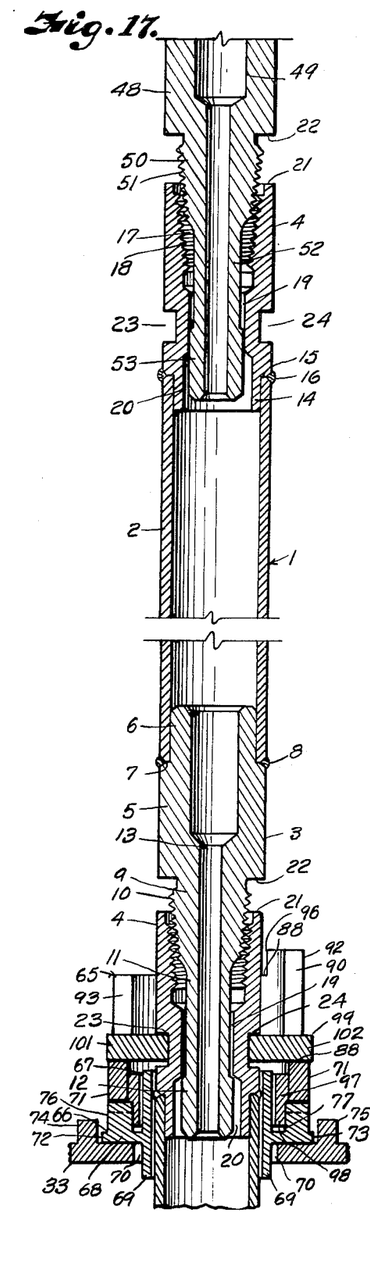
FIG. 17 is a vertical section similar to FIG. 14, but showing both ends of the drill pipe section disconnected and ready to be removed in any suitable manner.

During unscrewing of the pin 50 from the upper box, the fork 99 with the string of drill pipe moves downwardly, as shown in FIG. 13, until the threads become disengaged, whereupon the drilling string drops until the lugs 101 and 102 of the fork 99 engage the bottoms 87 of the slots 85 and 86, as shown in FIG. 14. This brings the driving lug 53 of the spud 48 into the driving socket 19 of the upper box 4, so that further rotation of the spud 48 turns the drill pipe section that is to be removed and breaks loose the threaded connection of the pin 9 with the threads 18 in the box 4 directly supported by the fork 99. During unscrewing of the latter threads, the upper section of drill pipe moves upwardly until the threads are disengaged, at which time the driving lug 12 has just reached the upper end of the recess 20.

The drill pipe section is then free to be removed on withdrawing the driving lug 53 of the spud 48 from the upper box and lifting of the lower driving lug 12 from the box 4 of the drilling string that is supported by the fork 99, by any of the above mentioned racking means.

The other drill pipe sections are removed in like manner.

While the operation for breaking the joints appears as described in steps, the actual operation is continuous and performed automatically incidental to rotation of the drill pipe spud, with the traveling head retaining a constant level with the exception of the times it must be lifted to remove the breakout shank of the spud from a drill pipe section to be racked.

It is obvious that there is no way to establish if the tool joint at the bottom or top end of a drill pipe section will be first to break out, but in either instance the drill pipe that is supported by the fork drops to bring the driving lug of the broken-out joint into driving engagement with a driving socket to break out the other joint. The breaking out of one tool joint is, therefore, immediately followed by the automatic breaking out of the other coupling. All that is required of the drilling crew is that one of the crew place the fork 99 and remove it at the proper times, while another member of the crew controls actuation of the hoist which raises and lowers the traveling head 25. The latter control only occurs between the breaking out periods, since the traveling head is stationary during the breaking out periods. The fork may be applied at the termination of the hoisting periods, after which the drilling string may be lowered to seat the fork upon the ratchet collar.

It is obvious that the present invention reduces the breakout time, requires no tongs, and eliminates many of the hazards of manipulating a drilling string in the drilling of a bore hole.

While the invention is illustrated and described as pertaining to drill pipe sections, it is obvious that the invention is adaptable to any string of members interconnected by pin and box couplings.

What I claim and desire to secure by Letters Patent is:

1. A drill member for connection with corresponding drill members making up a drilling string,
   said drill member including an elongated body having a pin at one end provided with external threads and having a box at the other end provided with internal threads,
   said box having an internal clutch means coaxially aligned with the base of the threads,
   a shank extending coaxially from the pin, and clutch means on the shank corresponding in shape with the clutch means in the box.

2. In an apparatus of the character described, a drill pipe member having a pin at one end provided with external threads and having a box at the other end provided with internal threads,
   said box having a socket of sqaure cross section at the base of the threads,
   a shank extending coaxially from the pin, and
   a head on the shank corresponding in shape with the socket.

3. A drill member for connection with corresponding drill members making up a drilling string,
   said drill member having a tubular body,
   a pin member having a reduced extension sleeved in one end of the tubular body,
   a weld connecting the pin member to the tubular body,
   a pin on the outer end of the pin member and provided with external threads,
   a box member provided with a reduced extension sleeved in the other end of the tubular body,
   a weld connecting the box member to the tubular body,
   said box member having internal threads conforming to the threads of the pin and having a clutch socket extending from the base of the threads towards the drill pipe,
   a shank extending coaxially from the pin and having a length greater than the depth of the clutch socket, and
   a clutch head on the shank corresponding in shape with the clutch socket.

4. A drill pipe section for connection with a corresponding drill pipe section, said drill pipe section including
   an elongated body,
   an internally threaded box at one end of said body and having an inner clutch part at the terminal of the threads,
   an externally threaded pin on the other end of said body for connection with the box of a corresponding section, and
   a clutch part carried by the pin and spaced from the threads of said pin to retain the clutch part on the pin out of engagement with the clutch part on the box during connection and disconnection of said threads of said pin with the threads of the box of the corresponding section and for interengagement of said clutch parts upon axial movement of the drill pipe section relatively to said corresponding section for rotating both of said sections together.

5. In combination,
   drill pipe sections each including a tubular body,
   a pin member fixed to one end of the tubular body and provided with external threads,
   a box member fixed to the other end of the tubular body,
   internal threads within the box member for connection with the threads on the pin when the sections are connected together,
   said box member having an inner clutch socket at the base of the threads,
   means for connection to the box of the endmost section to rotate the endmost section while the section connected thereto is held from rotation to unscrew one or the other end of the endmost section,
   a shank on the rotating means,
   a shank on the pin of said section,
   said shanks being of a length to extend rotatably through the clutch socket of a box member when the drill pipe sections are connected together, and
   a clutch head on the end of each shank and rotatable with the shank when the threads of a pin are unscrewed from the threads of a box in freeing an end of the endmost section to permit axial movement of the box from the pin to engage the clutch head in the socket of said box to effect disconnection of the other end of the endmost section through continued rotation of said rotating means.

6. An apparatus for breaking out the joints of a series of members, each having an externally threaded pin on one end and an internally threaded box on the other end with the pin of one member threaded into the box of an adjoining member to provide the joint between said members, said apparatus including
   a hoisting means,
   interengaging means on each pin and box with the interengaging means on a pin extending through the interengaging means on the box that is connected with said pin,
   a spud connected with the hoisting means and having a pin connected with the box of the uppermost member,
   interengaging means on the pin of said spud and extending through the interengaging means in the box of the uppermost member,
   means for supporting the connected series of members independently of the hoist and for holding the connected series of members from rotation, and
   means for rotating said spud for breaking out one of the pins from its box at one of the ends of said uppermost member for disconnecting that end of the uppermost member for axial relative movement to bring the interengaging means of the box of the disconnected joint into engagement with the interengaging means on said pin of the disconnected joint so that the rotating means for the spud breaks out the connection at the other end of the uppermost member.

7. An apparatus as described in claim 6, wherein said supporting means includes a ratchet collar through which the connected series of members extends, said ratchet collar comprising
   a fixed part having an encircling flange provided with ratchet teeth, and
   a movable part having rotatable support on the fixed part and having ratchet teeth engaging the teeth of the fixed part in the breakout direction of rotation of the spud,
   said teeth allowing for rotation of the movable part in the makeup direction of the spud.

8. An apparatus as described in claim 6, wherein said supporting means includes
   a ratchet collar through which the connected series of members extends,
   said ratchet collar comprising
   a fixed part having an encircling flange provided with ratchet teeth,
   a movable part having rotatable support on the fixed part and having ratchet teeth engaging the teeth of the fixed part in the breakout direction of rotation of the spud, and
   upstanding lugs on opposite diametrical sides of the movable part,
   said movable part having downwardly extending slots at said lugs, and
   a fork member engageable with the adjoining member and having lugs engageable with the lugs to hold said adjoining member from rotation and movable downwardly within said slots to provide said axial movement, said teeth allowing for rotation of the movable part in the makeup direction of the spud.

9. An apparatus for breaking out the joints of a series of members, each having an externally threaded pin on one end and an internally threaded box on the other end and connected together with the pin of one member threaded into the box of an adjoining member to provide the joints between said members, said apparatus including a hoisting means, interengaging means on each pin and box with the interengaging means on a pin extending through the interengaging means on the box that is connected with said pin, said boxes having transverse notches in opposite outer sides thereof, a spud connected with the hoisting means and having a pin connected with the box of the uppermost member, interengaging means on said spud and extending through the interengaging means in the box of the uppermost member, a ratchet collar having upper seats on opposite sides of diametrically opposed slots terminating in lower seats at bottoms of the slots and having upstanding lugs on the ratchet collar at one side of the slots, means for rotating said spud, and a fork for engagement in the notches in the sides of the box on the next adjoining member and having lugs projecting from opposite diametrical sides of the fork for initial support on the upper seats of the ratchet collar to engage with the lugs of the ratchet collar for interrupting rotation of the said next adjoining member for breaking out one of the pins from its box at one of the ends of said uppermost member to disconnect that end of the uppermost member to drop said next lower member with the lugs of the fork engaging the seats at the bottoms of the slots to support the interconnected members and to bring the interengaging means of the box of the disconnected joint into engagement with the interengaging means on said pin of the disconnected joint so that said rotating means breaks out the pin of the connected joint at the other end of the uppermost member.

10. An apparatus for breaking out the joints of a string of drill pipe made up of drill pipe sections each coupled to an adjoining section by an externally threaded pin and an internally threaded box member respectively on adjoining ends of said adjoining drill pipe sections when the drilling string is to be pulled from a bore hole by a hoisting means in a mast of a drilling rig and while the string of pipe is connected to rotating mechanism of said rig, said breakout apparatus including interengaging means on each pin and box with the interengaging means on a pin extending through the interengaging means on the box that is connected with said pin, a drill pipe spud connected with the hoisting means and having a pin connected with the box of the uppermost drill pipe section of the drilling string, interengaging means on said spud and extending through the interengaging means in the box of the uppermost drill pipe section, means for supporting the drilling string separately from the hoist and having a seat, a stop on the support and extending downwardly to said seat, and means for engaging the next lower drill pipe section for contact with said stop on the supporting means to interrupt rotation of the said next lower drill pipe section for breaking out one of the pins from the boxes of said uppermost and said next lower drill pipe sections for disconnecting a joint at one end of the uppermost section under power of the rotating means to drop said next lower drill pipe section and bring the means attached thereto onto said seat for supporting the drilling string and to bring the interengaging means of the box of the disconnected joint into engagement with the interengaging means on said pin of the disconnected joint for the power means to break out the pin of the connected joint at the other end of the uppermost drill pipe section.

11. An apparatus for breaking out the joints of a series of members, each having an externally threaded pin on one end and an internally threaded box on the other end with the pin of one member threaded into the box of an adjoining member, said apparatus including a hoisting means, interengaging means on each pin and box with the interengaging means on a pin extending through the interengaging means on the box that is connected with said pin, a spud connected with the hoisting means and having a pin for connection with the box of the uppermost member, interengaging means on the pin of said spud and extending through the interengaging means in the box of the uppermost member, means for supporting the series of members independently of the hoist and having a seat, means on said supporting means extending downwardly of said supporting means to said seat and providing a stop, means for rotating said spud, and means for engaging the next immediately adjoining member for contact with said top on the supporting means to interrupt rotation of the said next immediately adjoining member for breaking out one of the pins from the box of said uppermost member or the box of said adjoining member for disconnecting one end of the uppermost member to drop the members that are still connected and bring the engaging means onto said seat to support the connected members on said supporting means and to bring the interengaging means in the box of the disconnected joint into engagement with the interengaging means on said pin of the disconnected joint so that the rotating means breaks out the pin of the connected joint at said other end of the uppermost member.

12. In combination with a traveling head having a spindle rotatably carried in said head and driving means on the head for rotating the spindle, a spud fixed to the spindle and having an externally threaded pin on its lower end, a string of drill pipe members each having an externally threaded pin on one end and an internally threaded box on the other end and connected together with the pin of one member threaded into the box of an adjoining member to provide the joints between said members, said box of the uppermost drill pipe member being connected with the pin of the spud, interengaging means on each pin and box with the interengaging means on a pin extending through the interengaging means on the box that is connected with said pin, said interengaging means on each box being supported out of contact with the interengaging means on the pins when the pins are tightened into the boxes, and means for holding the next to the uppermost drill pipe member from rotation to disconnect one end of the uppermost drill pipe member incidental to rotation of the spud, said holding means having means for dropping the drill pipe member a distance for bringing the interengaging means of the disconnected end of the uppermost drill pipe member into interengagement to disconnect the other end of the uppermost drill pipe member.

13. In combination with a traveling head having a spindle rotatably carried in said head and driving means on the head for rotating the spindle,
   a spud fixed to the spindle and having an externally threaded pin,
   a string of drill pipe members each having an externally threaded pin on one end and an internally threaded box on the other end and connected together with the pin of one member threaded into the box of an adjoining member to provide the joints between said members,
   said box of the uppermost drill pipe member being connected with the pin of the spud,
   interengaging means on each pin and box with the interengaging means on a pin extending through the interengaging means on the box that is connected with said pin,
   a ratchet collar having upper seats on opposite sides of diametrically opposed slots terminating in seats at bottoms of the slots and having lugs on the ratchet collar at one side of the slots, and
   a fork for engagement in the notches in the sides of the box on the next adjoining member and having diametrically opposed lugs for placement upon the upper seats of the ratchet collar to engage with the lugs of the ratchet collar for interrupting rotation of the said next adjoining member for breaking out one of the pins from its box at one of the ends of said uppermost member for disconnecting that end of the uppermost member to drop said next lower member and bring the lugs of the fork onto the seats at the bottoms of the slots to support the interconnected members and to bring the interengaging means of the box of the disconnected joint into engagement with the interengaging means on said pin of the disconnected joint so that the power means breaks out the pin of the connected joint at the other end of the uppermost member.

References Cited by the Examiner
UNITED STATES PATENTS

| | | | |
|---|---|---|---|
| 1,637,628 | 8/1927 | Weisgerber | 285—27 |
| 1,753,771 | 4/1930 | Buckwalter | 29—427 |
| 1,777,481 | 10/1930 | Black | 285—18 |
| 2,470,262 | 5/1949 | Payzer | 29—427 |
| 2,782,004 | 2/1957 | Harrigan | 29—427 |
| 2,976,943 | 3/1961 | Curtis | 173—164 |
| 3,002,769 | 10/1961 | Deubler et al. | 285—39 |
| 3,056,614 | 10/1962 | McClintock et al. | 285—39 |
| 3,122,211 | 2/1964 | Wilson et al. | 173—164 |
| 3,125,173 | 4/1964 | Fox | 285—333 |

BROUGHTON G. DURHAM, *Primary Examiner.*

BENJAMIN HERSH, *Examiner.*

J. A. LEPPINK, L. P. KESSLER, *Assistant Examiners.*